United States Patent [19]
Proehl et al.

[11] Patent Number: 6,118,450
[45] Date of Patent: Sep. 12, 2000

[54] GRAPHIC USER INTERFACE THAT IS USABLE AS A PC INTERFACE AND AN A/V INTERFACE

[75] Inventors: Andrew M. Proehl, New York; Kimberly Mingo, Brooklyn, both of N.Y.; Rich Gioscia, Mahwah, N.J.

[73] Assignees: Sony Corporation, Tokyo, Japan; Sony Electronics, Inc., Park Ridge, N.J.

[21] Appl. No.: 09/054,997

[22] Filed: Apr. 3, 1998

[51] Int. Cl.[7] .............................. G06F 3/00; G11B 27/10
[52] U.S. Cl. .................. 345/349; 345/302; 345/329; 369/30; 369/34; 707/104; 709/203
[58] Field of Search .................. 345/328, 327, 345/302, 349, 970, 978, 353, 357, 329; 386/55, 66, 54, 69, 70; 707/501, 104; 369/30, 32, 34; 709/203

[56] References Cited

U.S. PATENT DOCUMENTS

| | | | |
|---|---|---|---|
| 5,553,221 | 9/1996 | Reimer et al. | 345/333 |
| 5,587,979 | 12/1996 | Bluthgen | 369/32 |
| 5,627,657 | 5/1997 | Park | 386/70 |
| 5,740,134 | 4/1998 | Peterson | 369/30 |
| 5,754,172 | 5/1998 | Kubota et al. | 345/302 |
| 5,794,249 | 8/1998 | Orsolini et al. | 707/104 |
| 5,801,694 | 9/1998 | Gershen | 345/339 |
| 5,805,538 | 9/1998 | Kamada et al. | 369/34 |
| 5,864,868 | 1/1999 | Contois | 707/104 |
| 5,867,457 | 2/1999 | Parvulescu et al. | 369/33 |

*Primary Examiner*—Raymond J. Bayerl
*Assistant Examiner*—Cuong T. Thai
*Attorney, Agent, or Firm*—Frommer Lawrence & Haug, LLP.; William S. Frommer; Gordon Kessler

[57] ABSTRACT

A graphic user interface for use with a multi-recording media storage apparatus includes a determiner for determining the identity of at least one of a plurality of recording media retained within the apparatus and an accumulator for accumulating statistical information regarding the identity of that medium. Additional information is obtained from an external database based upon the identity of the recording medium, and further additional information is obtained from an external information source in accordance with the accumulated statistical information. The graphic user interface allows a user to view and manipulate the additional information and the further additional information in order to select a particular recording medium for playing, or to perform various other operations.

74 Claims, 12 Drawing Sheets

HOME SCREEN WITH ALL BUTTONS SHOWN IN THE ROLLOVER STATE.

LIBRARY SCREEN SHOWING PLAYLISTS AS IT WOULD APPEAR TO A NEW USER.

PLAYLIST SCREEN

PLAYLIST SCREEN WITH ALL BUTTONS SHOWN IN THE NORMAL STATE.

GRAPHIC USER INTERFACE THAT IS USABLE AS A PC INTERFACE AND AN A/V INTERFACE

BACKGROUND OF THE INVENTION

This invention relates generally to a graphic user interface and more particular to a graphic user interface for use with a multi-recording medium integrated player, including CD-ROM discs, DVD and DVD-R media, but most preferably audio compact discs (CDs). While multi-disc CD players have been available for quite some time, these players include only an extremely limited interface providing a user with little, if any information regarding the CDs contained therein. Thus, the user may not even be able to tell which CDs are retained within the player. It is apparent that this limited user interface for contact between the apparatus and the user has been insufficient.

The insufficient user interface poses an increasing problem as the number of discs which may be stored in a multi-disc player increases. Generally, multi-disc CD players include a plurality of CDs retained within the player hidden from view. The number of CDs can be any number up to 200 CDs or more. However, since a user cannot view the CDs, the user cannot be sure which CDs are positioned within the player or at which location within a player a particular CD is positioned. If the user wishes to play a particular CD, it may be very difficult or time consuming for a user to select that particular CD out of the plurality of CDs in the player.

In order to remedy this problem, more advanced multi-disc CD players have allowed a user to enter a small number of characters to be associated with a particular CD. For example, the user inserts the CD into the player and then operates selector keys to select a sequence of characters, perhaps a title, to be associated with the CD. These characters are retained in memory with the code of the CD. Thus, anytime the CD is placed within the CD player, or selected to be played, the associated characters are displayed. While this ability is an improvement, the user is required to enter the character information to be associated with each CD, and the information displayed is very minimal. Also, typically the user can only view the displayed information when a CD is selected to be played. Thus the viewing of the information is very slow, and does not allow for viewing information related to additional CDs when a first CD is playing.

Recently, new CDs may include additional text information, known as "CD text" regarding the title and contents of the CD, which can be read and displayed by the CD player. Thus, a limited amount of information can be retrieved by the CD player from the CD and displayed to the user. However, most CDs do not have this information included thereon. Additionally, typical CD-ROM players contain a very limited display which would be insufficient to display any more than only an extremely minimal amount of information regarding each of these CDs. Finally, even if this information is available, it must be fixed at the time the CD is produced, and thus cannot be updated or augmented, if desired.

Therefore, it would be beneficial to provide an enhanced, improved graphic user interface for displaying information about a particular CD in a CD player, for obtaining information about a CD in the CD player if the information is not contained on the CD, for obtaining additional, updated information regarding each CD contained within the CD player and for allowing additional advance functions to be accessed by the user.

OBJECTS OF THE INVENTION

Accordingly, it is an object of the invention to provide an improved graphic user interface for use with a multi-disc player which can acquire and display disc information.

Another object of the invention is to provide an improved graphic user interface for use with a multi-disc CD player which can obtain and display information about a particular CD, even if this information is not stored on the CD.

A further object of the invention is to provide an improved graphic user interface for use with a multi-disc CD player which obtains and displays textual and graphic information about a CD, even if this information is not stored on the CD.

An additional object of the invention is to provide an improved graphic user interface for use with a multi-disc CD player which allows for the acquisition and display of expanded graphic, audio and textual information regarding each CD retained within the CD player, and allows a user to manipulate the CDs based upon this information.

Yet another object of the invention is to provide an improved graphic user interface for use with a multi-disc CD player which analyzes the play frequency of a particular CD album, or artist, obtains updated news information, and other pertinent updated information regarding the artist or CD from an offsite database, and displays this information to a user.

A still further object of the invention is to provide an improved graphic user interface for use with a multi-disc CD player which allows a user to store various playlists under names, and then to manipulate these playlists as if they were CDs, thus defining a "virtual media".

Still other objects and advantages of the invention will in part be obvious and will in part be apparent from the specification and the drawings.

SUMMARY OF THE INVENTION

Generally speaking, in accordance with the invention, an improved graphic user interface for use with a multi-recording medium integrated player, and more particularly for use with a multi-disc CD player is provided. Such multi-disc CD players to which the improved graphic user interface of the invention may be applied are described in copending application Ser. No. 09/055,139 filed Apr. 3,1998, the full contents of which are incorporated herein by reference. The improved graphic user interface of the invention determines the identity of at least one of the recording media (CDs) retained within the multi-disc CD player, and accumulates statistical information regarding the identity of the at least one CD and of the play characteristics of the multi-disc CD player. The improved graphic user interface of the invention obtains additional updated information from an external database regarding each of the at least one CD retained therein, including additional textual information, audio and graphic information such as song listings, cover art and associated music tracks, and is also able to obtain further additional information in accordance with the accumulated statistical information, such as additional news regarding an often played artist, concert information, or other information which might be of interest to a user, based upon the selection or genre of most often played music by the user or simply based upon the character of the music collection of the user retained within the CD player.

The graphic user interface constructed in accordance with the invention allows for the automated download of cover art, liner notes, and other information which would typically be contained within a CD jewel box, and for viewing of this information graphically, or textually by a user. Custom news based on a user's CD collection which is retained within the multi-disc CD player, and on the frequency of play of a particular CD, or frequency of play of the CDs by a particular artist may also be accessed. The sorting and searching of the CDs by the user may be based on standardized, or personal attributes of the CD collection contained within the multi-disc CD player.

In accordance with the invention, a playlist may be designed, and saved as a "virtual media". This playlist may be manipulated as if it were an actual CD, but is actually retained within internal memory within the player. In addition to being stored within internal memory, these playlists can also be stored on additional recordable rewritable media, such as a digital audio tape, a mini disc, or the like.

The graphic user interface may also provide a user the opportunity to access a specific website on the worldwide web based on the same, or additional statistical information utilized to determine which news or the like should be downloaded. The graphic user interface of the invention additionally allows the user to manipulate the CDs retained within the multi-disc CD player based upon this additional downloaded information, thus providing an improved method for accessing the CDs in a multi-disc player.

The invention accordingly comprises the several steps in the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
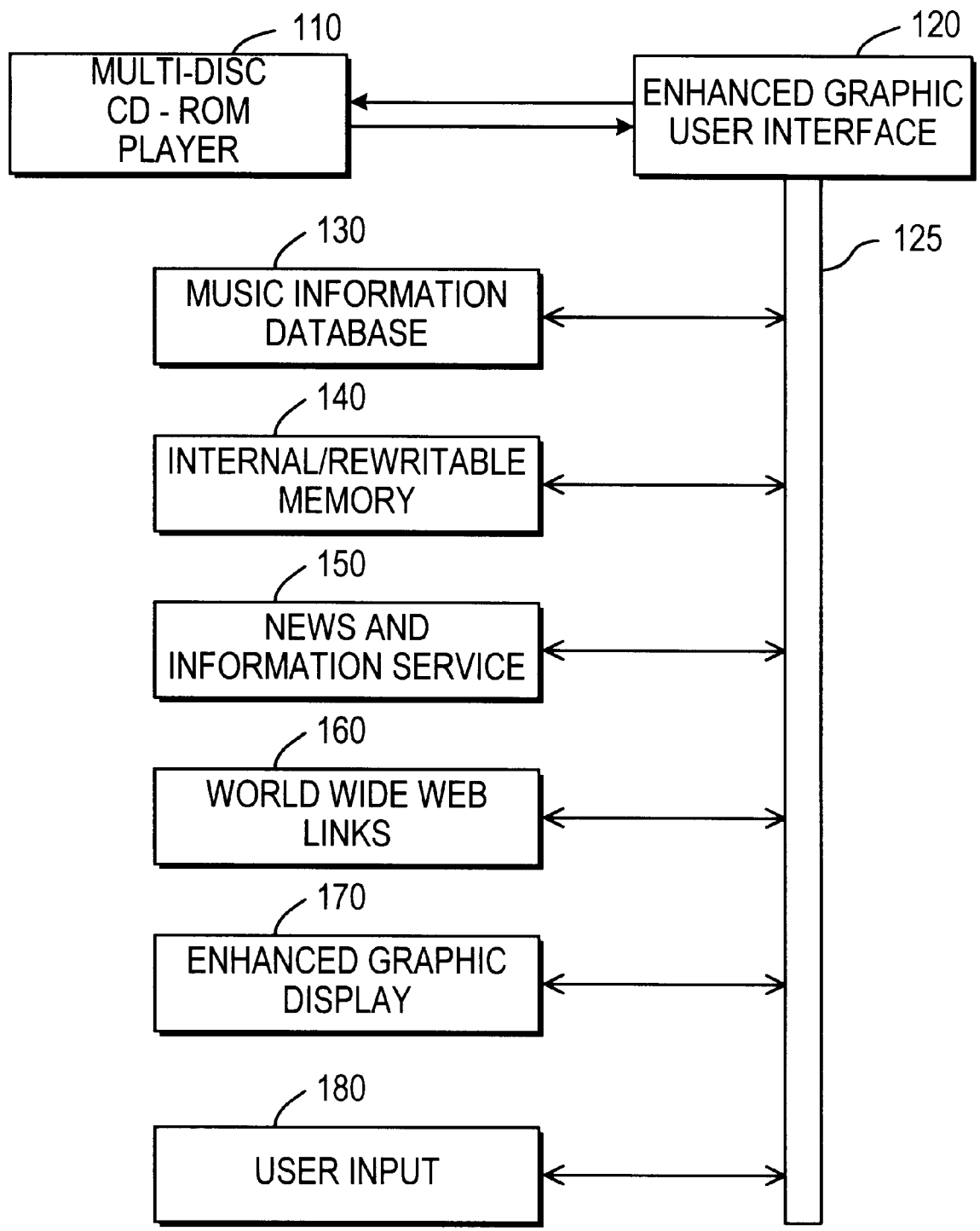
FIG. 1 is a block diagram representation of the relationship between an enhanced graphic user interface constructed in accordance with an embodiment of the invention, and various other interacting features.

Reference is first made to FIG. 1 which depicts a block diagram of the relationship between a multi-disc CD player, enhanced graphic user interface constructed in accordance with the invention, and additional information and display apparatuses. Specifically, a multi-disc CD player 110 is electronically coupled with an enhanced graphic user interface 120. Enhanced graphic user interface 120 may comprise a personal computer, television set, or the like. Enhanced graphic user interface 120 allows the display of various graphic, textual, or other information associated with one or more CDs retained within multi-disc CD player 110. Enhanced graphic user interface 120 is connected via a communication bus 125 to a plurality of external information sources and display apparatus, such as a music information database 130, an internal rewritable memory 140, a news service 150, a worldwide web link 160, an enhanced graphic display 170, and a user input 180. User input 180 may comprise a mouse, if enhanced graphic user interface 120 comprises a personal computer, or may comprise a remote controller, such as for a television, if graphic user interface 120 comprises a television, or the like.

Each of these further connected elements shown in FIG. 1 will be described in further depth below.

Figure 2:
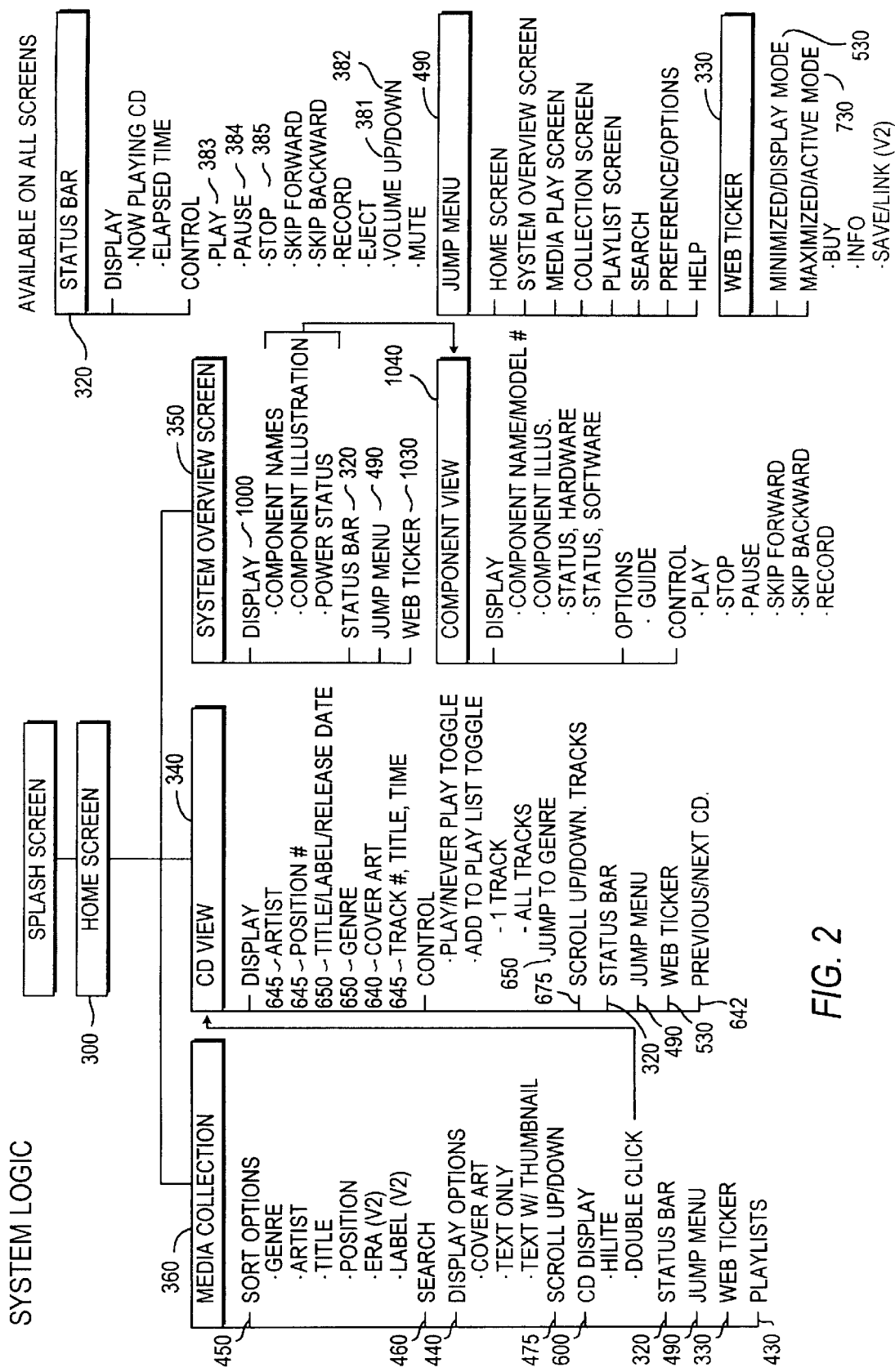
FIG. 2 is a logical representation depicting the relationship between each of the features of the enhanced graphic user interface of the invention.

FIG. 2 depicts the logical relationship between the various screens and features of the graphic user interface constructed in accordance with the invention. The structure of FIG. 2 will now be described, making reference to various other figures, as the screens they depict are encountered. As is shown in FIG. 2, a splash screen is first encountered, which gives way to a home screen 300, such as that shown in FIG. 3. The home screen allows a user to play a CD, configure the hardware system, get help regarding the system, search for a particular CD, or view the CD library.

Figure 3:
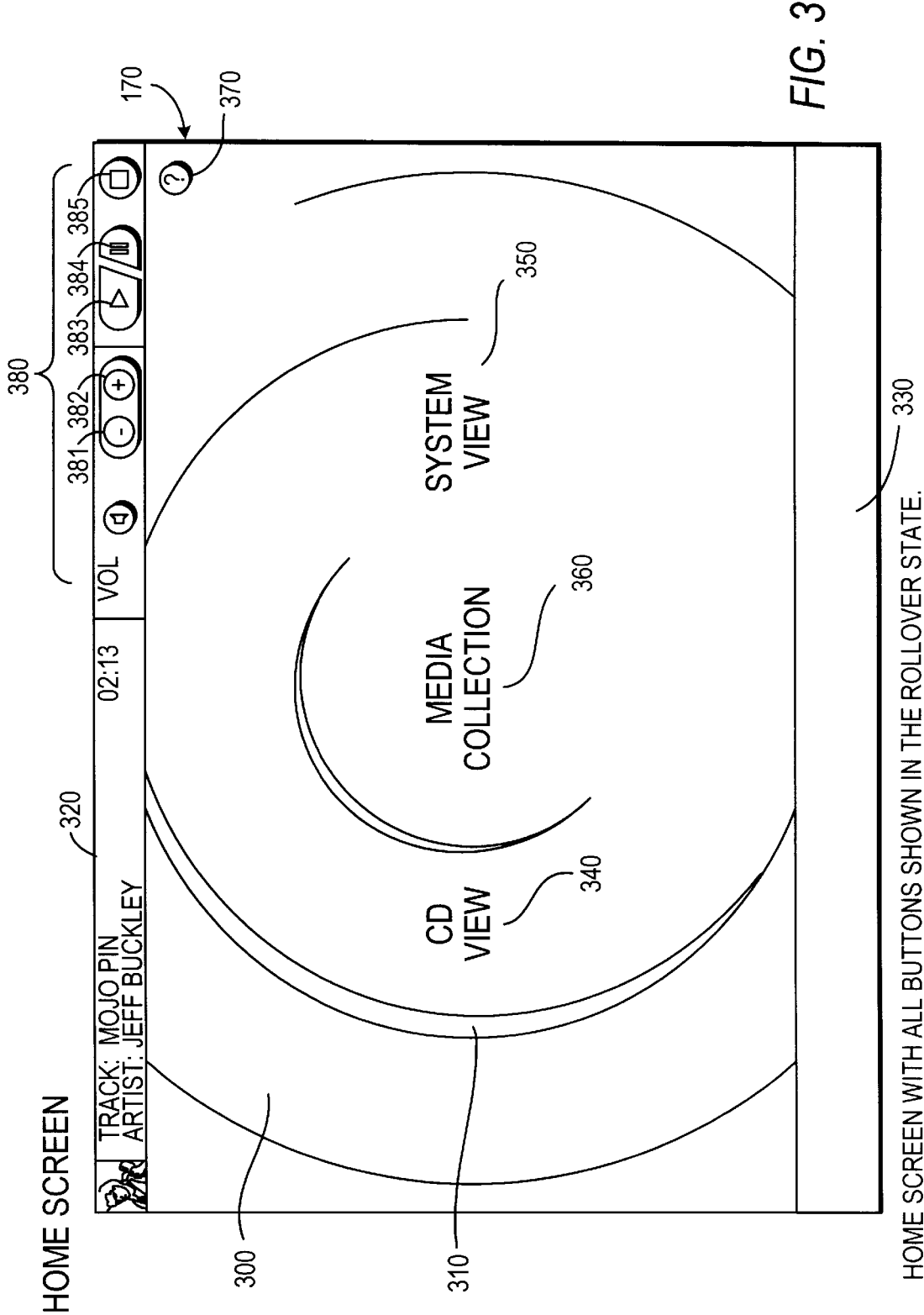
FIG. 3 is a representation of a first screen encountered during the use of the enhanced graphic user interface of the invention.

As is shown in FIG. 3, enhanced graphic display 170 is formed with home screen 300 depicted therein. Home screen 300 is comprised of a media content area 310 in the center, a status bar 320, and a ticker portion 330. Media content area 310 allows a user to make one of three selections. These three selections include a CD view menu 340 for viewing information about a particular CD, a system view menu 350 for viewing and configuring various hardware components and a media collection menu 360 for viewing the library of CDs retained within the player. Also included is a help button 370, and various media control buttons 380 positioned within status bar 320. Status bar 320 also displays information representing the currently playing CD, and elapsed time, along with various other information. Status bar 320 depicts the current state of the CD being played, and also includes, among control buttons 380, up and down volume control buttons 381 and 382, play button 383, pause button 384 and stop button 385, for easy control of the currently playing CD. Furthermore, a drop-down "panel" (not shown) may be provided which is accessible from the control buttons portion 380 of status bar 320, which provides additional functionality, such as fast forward, rewind and the like.

The media collection menu 360 allows a user to view a library of information regarding the CDs retained within multi-disc CD player 110. The system view menu 350 allows a user to define various hardware and software settings for the apparatus, including, but not limited to, the number of multi-disc CD players which may be coupled together, the number of discs in each multi-disc CD player 110, and various other settings for allowing a user to replay or record information from CDs maintained within the multi-disc CD player. Finally, CD view menu 340 allows a user to access, play, and perform various functions on one of the CDs maintained within multi-disc CD player 110, as will be described below.

Figure 4:
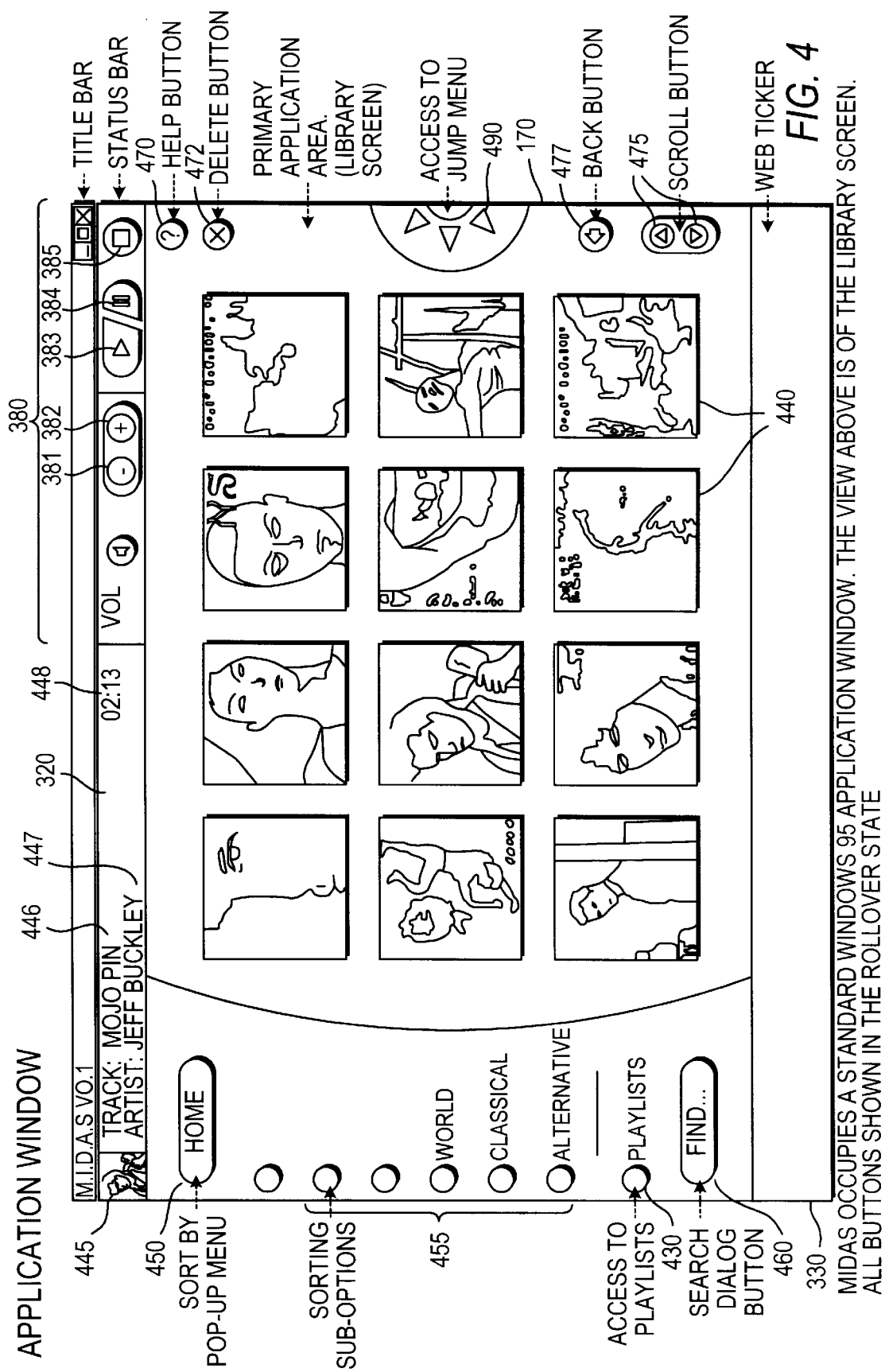
FIG. 4 is a representation of the display of cover art for the CDs in a user's CD player, as provided by the enhanced graphic user interface of the invention.

As is further shown in FIG. 2, when media collection menu 360 is selected, various options are provided to the user. Upon this media collection menu 360, a screen such as that depicted in FIG. 4 is shown to the user. As is shown in FIG. 4, enhanced graphic display screen 170 displays a plurality of cover art material from a plurality of CDs. Each of these CD cover art graphics corresponds to one of a plurality of CDs maintained within multi-disc CD player 110. The user may alternatively select text only for display, or text with a thumbnail sketch, as noted in FIG. 2.

Initially, a user loads a plurality of CDs into multi-disc CD player 110. Thereafter, enhanced graphic user interface 120 recognizes at least an identification code from each CD, and issues a communication request via communication bus 125 to music information database 130 (see FIG. 1). This communication request informs music information database 130 of the identification of each of the CDs which is maintained within the multi-disc CD players and requests additional information regarding each of those CDs. This additional information comprises at least CD jewel box cover art, by way of example, such as shown in FIG. 4. Various other information including, but not limited to, liner notes, track information for the CD, and other data or indicia which may be related to a CD. In addition, other related information might be provided for each of the CDs, such as general information regarding the artist, or album, concert information, ticket information, news releases and the like. Additionally, the information might include updated information which has been made available regarding the CD, the artist whose performance is recorded on the CD, or the like, after production of the original CD disc. Thus, updated information may be continuously retrieved regarding each of the CDs maintained within multi-disc CD player 110. Various other features of displaying information will be described below.

After the additional information for each CD maintained within the multi-disc CD player is retrieved, or downloaded, from music information database 130, this information is stored in internal/rewritable memory 140. After storage therein, enhanced graphic user interface 120 obtains various portions of this information, such as the cover art of each CD 440 maintained within the multi-disc CD player, as shown in FIG. 4 by way of example. Graphic user interface 120 then displays this cover art on enhanced graphic display 170.

As is also shown in FIGS. 2 and 4, a sort option selector 450 is provided. FIG. 2 illustrates the various sort options from which the user may select, namely by genre, artist, title, position of the CD within player 110, record label, etc. FIG. 4 represents a sort by genre; and a genre indication is shown within sort option selector 450 within enhanced graphic display 170. Upon the selection of a genre sort, a plurality of sub-options, including various genres 455 to choose from, are displayed. If the additional information retrieved from music information database 130 includes a code indicating the genre into which each CD fits, the user may select by user input 180 a particular genre. As shown in FIG. 4, the user has selected the genre "rock", and information relating to all CDs retained within multi-disc CD player 110 which are related to the "rock" genre are displayed.

Enhanced graphic display 170 also is provided with scroll buttons 475 allowing the user to scroll through the displayed cover art if all the cover art cannot be displayed on a single screen. The enhanced graphic display is further provided with a help button 470 for allowing the user to access interactive help features, and a delete button 472 to allow the user to delete a disc (identified by its cover art) from a particular genre, or to perform other predefined delete functions. A search button 460 allows the user to search for a CD by any number of fields, such as title or artist, by way of example. This search can be performed within a particular sort option selected by sort button 450, such as a particular genre, or can be performed on the entire CD collection. A playlist button 430 allows access to user defined playlists and permits the user to define new lists, which will be described below. Once defined, a playlist may be manipulated as if it were an actual CD. A back button 477 is provided for allowing movement back one menu selection. Since the CD manipulation may take place while a particular CD is playing, status bar 320 is provided as in FIG. 3 for control of the CD currently being played by player 110.

Figure 8:
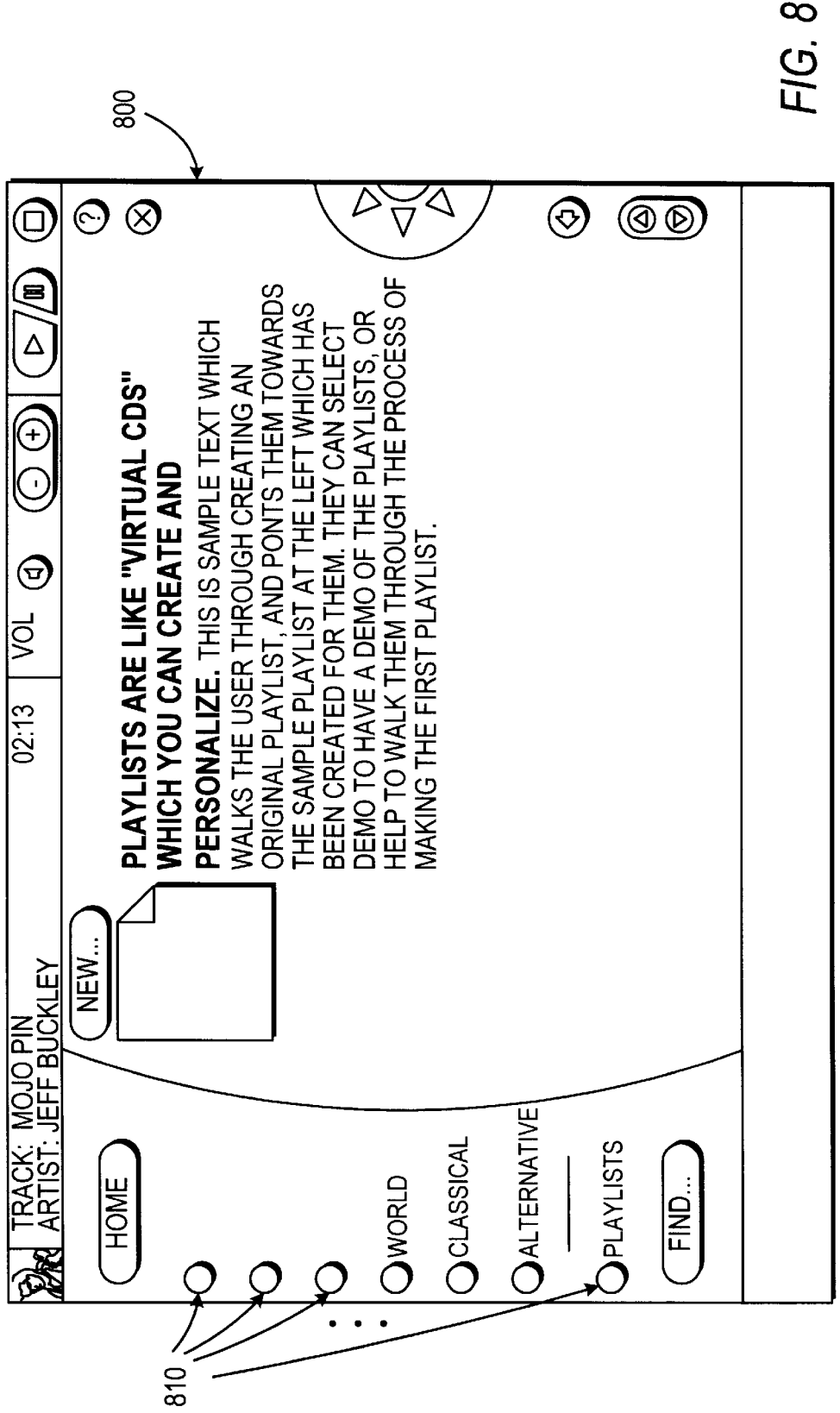
FIG. 8 is a representation of a playlist creation screen displayed by the enhanced graphic user interface of the invention.

A jump menu icon 490 is provided which allows for immediate access to various screens without requiring the user to sequence through the menu structure. As shown in FIG. 2, these screens include home screen 300, system view screen 350, a media play screen 600, a media collection screen 360, a playlist screen 800 (described below in connection with FIG. 8), a search screen 460, options screen 450 and a help screen (not shown), and may include various other screens, as desired.

Figure 5:
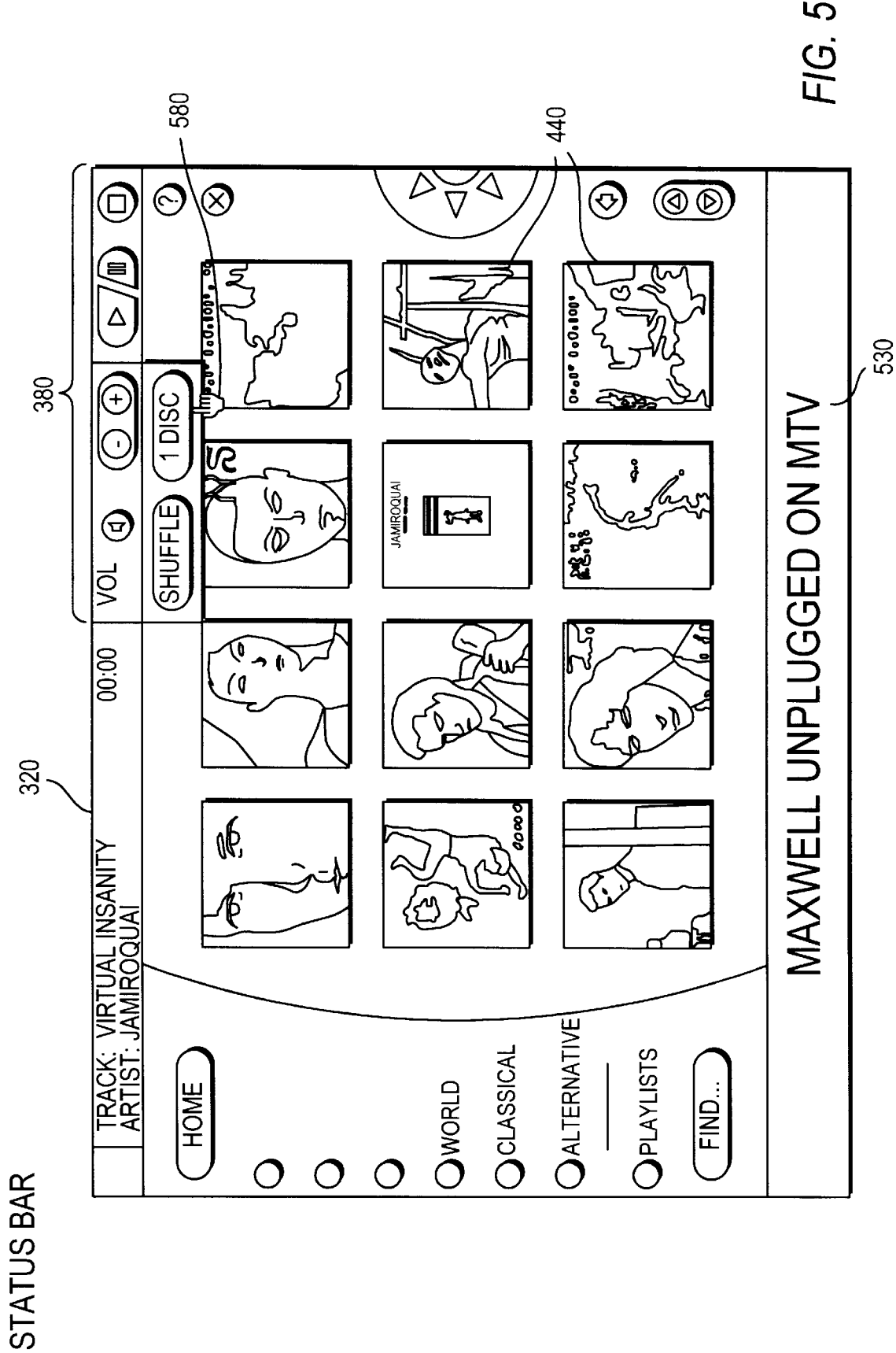
FIG. 5 is a representation of a web ticker displayed by the enhanced graphic user interface of the invention.

FIG. 5 depicts the display by enhanced graphic display 170 of CD cover art, an enhanced status bar control 580, and web ticker 530 in its minimized display mode. Enhanced status bar control 580 may be accessed by the user through user input 180, which might include a mouse, and allows for additional control over the current play mode status, such as between shuffle and disc play (as shown) and further allows for forward and reverse skipping, recording, ejecting and muting, (not shown) by way of example.

In addition to simply storing various information regarding each particular CD maintained within multi-disc CD player 110, the graphic user interface of the present invention obtains and compiles additional statistical information regarding the CDs retained within the player, as well as the frequency of play of such CDs. Thus, if a user loads a plurality of CDs from a particular artist into player 110, this will be noted within the software of the apparatus. Additionally, if a particular CD, or if CDs by a particular artist are played more frequently than those of other artists, this will also be noted. Finally, if CDs belonging to particular genres are played more often than those belonging to other genres, this too will be noted. Other combination of play frequency, and number of discs loaded per category can also be determined. Upon accumulation of this information, the graphic user interface determines various items of interest to the user, and assumes that the user will be interested in more in depth and updated information regarding these particular artists, groups or genres.

In a traditional information acquisition scheme, the user inputs a query regarding a topic in which the user is specifically interested. In the context of the current invention, this might include information regarding news of a particular artist, updated information regarding new tracks of an artist, concert or ticket information or the like. Traditionally, the user is essentially required to define the categories of information about which he or she is interested, and then enter this query into the apparatus, whereupon various information requested by the user is obtained and displayed.

However, in accordance with the invention, statistical information is derived automatically regarding the titles and types of CDs, the artists of the CDs, and the frequency of play of various CDs maintained within multi-disc CD player 110. Based upon this accumulated statistical information, the player determines the user's preferences, and obtains additional information regarding the artists, CDs, genres or the like in which the user has an interest. Thus, by playing a particular CD a large number of times, or by loading a large number of CDs by a particular artist, the graphic user interface of the present invention is able to determine that the user is specifically interested in these particular CDs, artists, or genres.

Referring once again to FIG. 1, enhanced graphic user interface 120 via communication bus 125 is able to transmit additional information requests to, for example an information service 150, worldwide web links 160, and music database 130 in order to obtain additional, updated information regarding the user's preferences as determined by the apparatus. As is shown in FIG. S, this additional information is displayed at ticker 530, for example, and might include news such as concert dates, television appearances, and other information regarding a particular artist. Additionally, internet links might be provided to the user, such as home pages for a particular artist, or various other worldwide web links intended to provide additional information to artists in which the user is specifically interested. Thus, in accordance with the invention the user is provided with a vast amount of expanded, updated information which is automatically retrieved from various sources, thus acting as a full information provider, without requiring the user to request any of the information.

This feature of determining user preferences is not only limited to determining preferences based upon loaded CDs, but may additionally determine preferences relating to hardware use. For example, if the user frequently records information from CDs maintained within multi-disc CD player 110 to a mini disc, or to other recording media, the present invention determines that the user frequently uses such dubbing techniques, and information regarding special hardware promotions which the user frequently uses and would thus be interested in may be accessed and provided. Thus, the present invention provides enhanced additional information regarding these preferences from external data sources to the user simply based on the user's practices when listening to music. The user need not specifically request this information, but rather it is automatically furnished to him or her, thus providing the user with the most up-to-date information regarding topics about which he or she is interested.

Referring once again to FIG. 4, to select a CD for playing, the user selects the desired CD 440, by operation of user input device 180 (such as the mouse) and then selects play button 383, also by user input device 180. Once a particular CD has been selected for play, a graphic 445 representing the cover art of the selected CD is forwarded to the upper left corner of enhanced graphic display 170 so that the user can view the cover art of the currently playing CD even if performing other functions with player 110. This forwarding may purposely take a predetermined amount of time to provide a time delay, which is preferable since the selected CD must be found within the multi-disc CD player, and loaded into the playback unit for playback. After the CD has been selected for play, the name of the song being played (446) and the name of the artist (447) are displayed in status bar 320. A counter 448 displays the elapsed time having passed during the playing of the song. Thus, all information is provided along status bar 320 once a CD has been selected for playing, even when the user is viewing information regarding other CDs on display 170, or is performing other functions with the apparatus.

Figure 6:
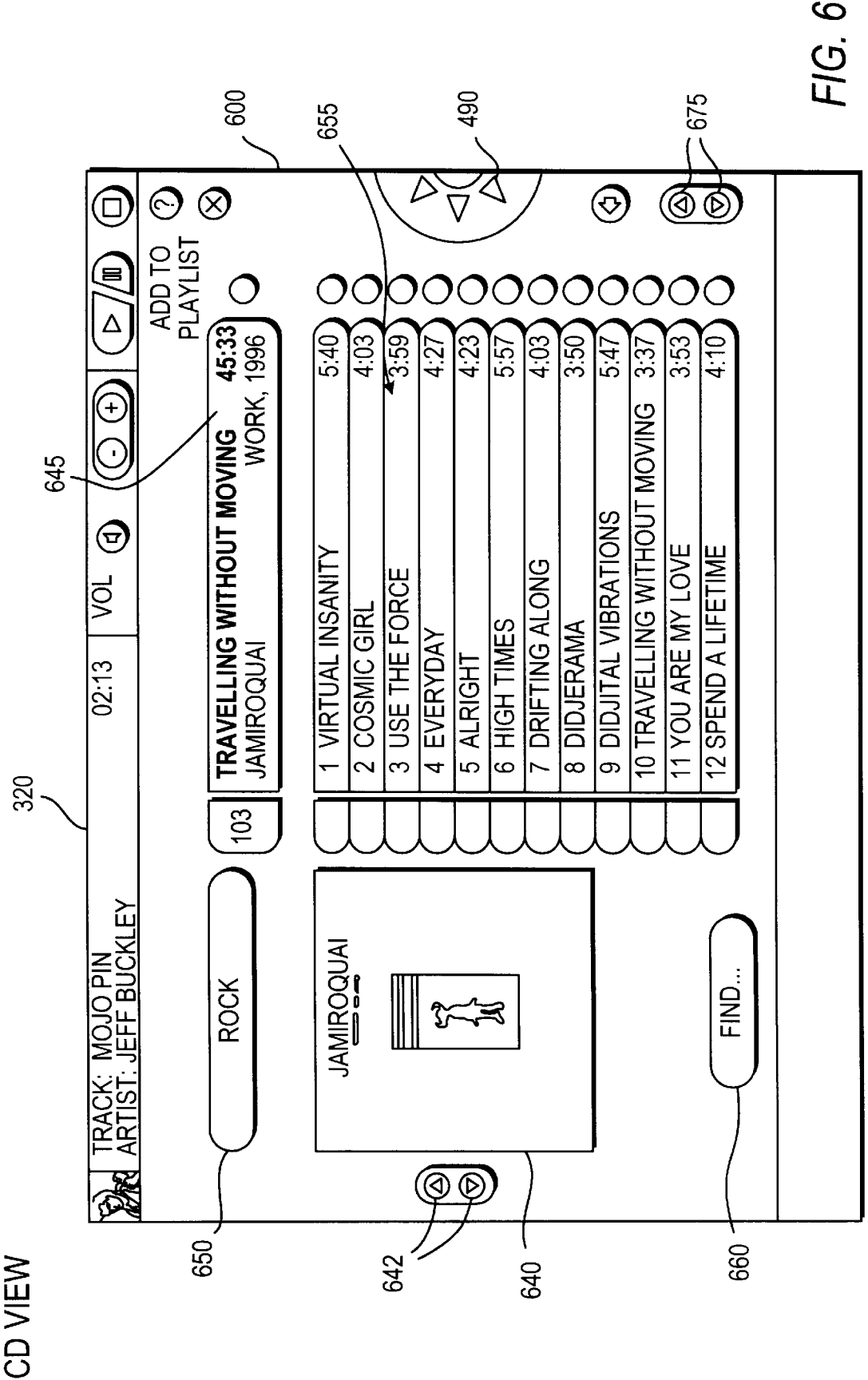
FIG. 6 is a representation of a display provided by the enhanced graphic user interface of the invention when a particular CD is selected.

FIG. 6 illustrates the selection of one of the plurality of CDs displayed in FIG. 5 (or FIG. 4), by double clicking the cursor controlled by user input 180 on the desired cover art. Upon the change to the screen shown in FIG. 6, status bar 320 still retains all information regarding the CD selected for playing in FIG. 5. FIG. 6 displays the jacket cover art 640 of the selected CD, along with the title of the selected CD, artist, and songs recorded on that CD. Other CD information obtained from music database 130, or other external information sources may be displayed in an information section 645. The display screen of FIG. 6 may be reached, alternatively, by selecting CD view from home screen 300 of FIG. 3 (see also FIG. 2).

A sort option selector 650 is also provided along with a search button 660 to change the viewed CD information, if desired. A track list 655 displays the songs recorded on the selected CD and from which the user is able to select various songs to be played. Scroll buttons 675 may be used to scroll up and down tracks, while scroll buttons 642 may be used to scroll through the list of CDs. The user can also place desired songs, or the entire CD on a playlist (described below).

Figure 7:
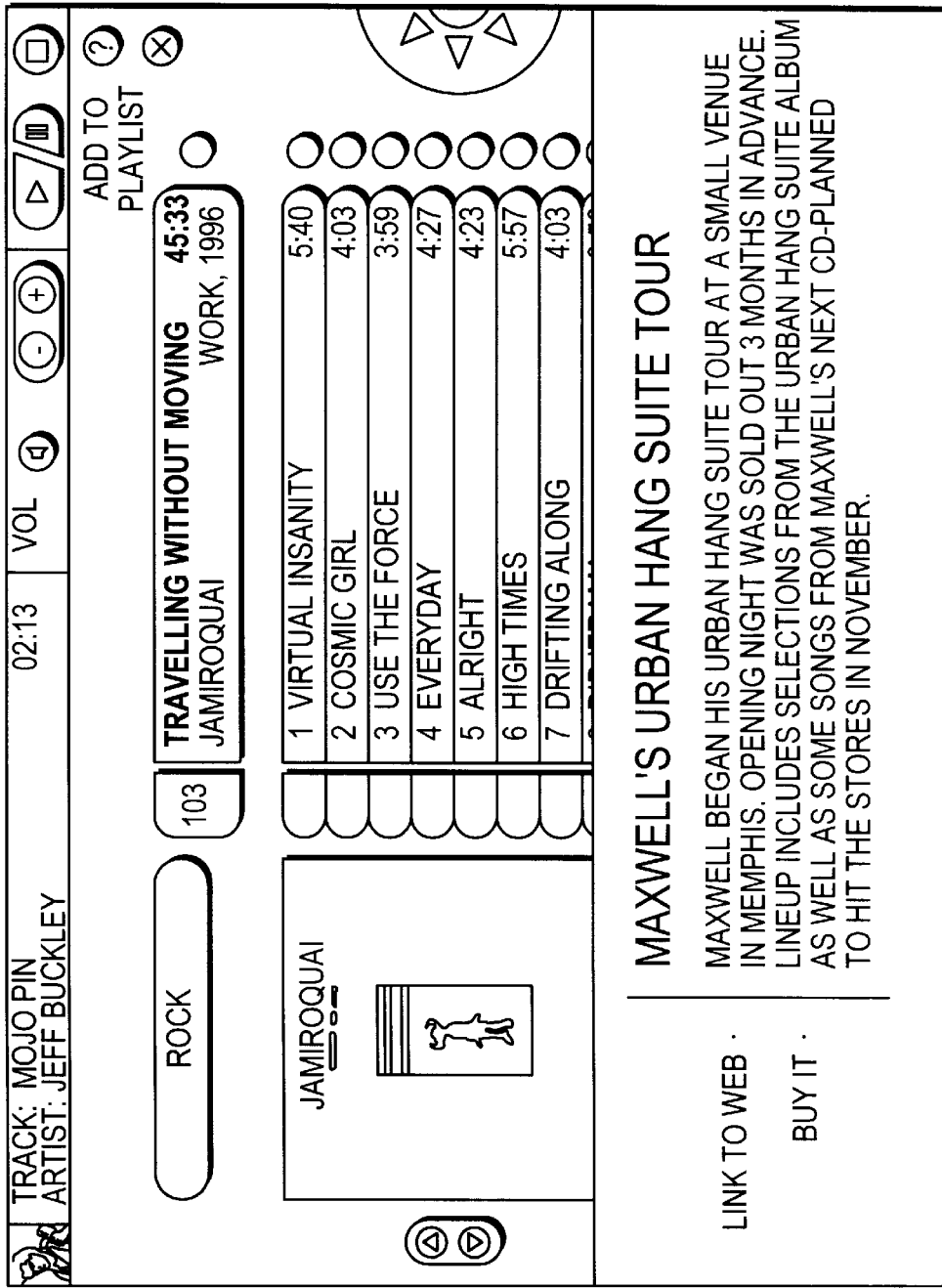
FIG. 7 is a representation of a web ticker in its open, or extended state, displayed by the enhanced graphic user interface of the invention.

Referring next to FIG. 7, the view screen of FIG. 6 is illustrated with a web ticker 730 shown in its maximized, active mode. The web ticker provides advertising and promotions to allow a user to buy a particular product, or to link to (and communicate with) a suggested web site. The user has the option to save the link for future access. Thus, through the statistical information gathering procedure discussed above, the user is given full access to various information in which he or she might be interested.

Figure 9:
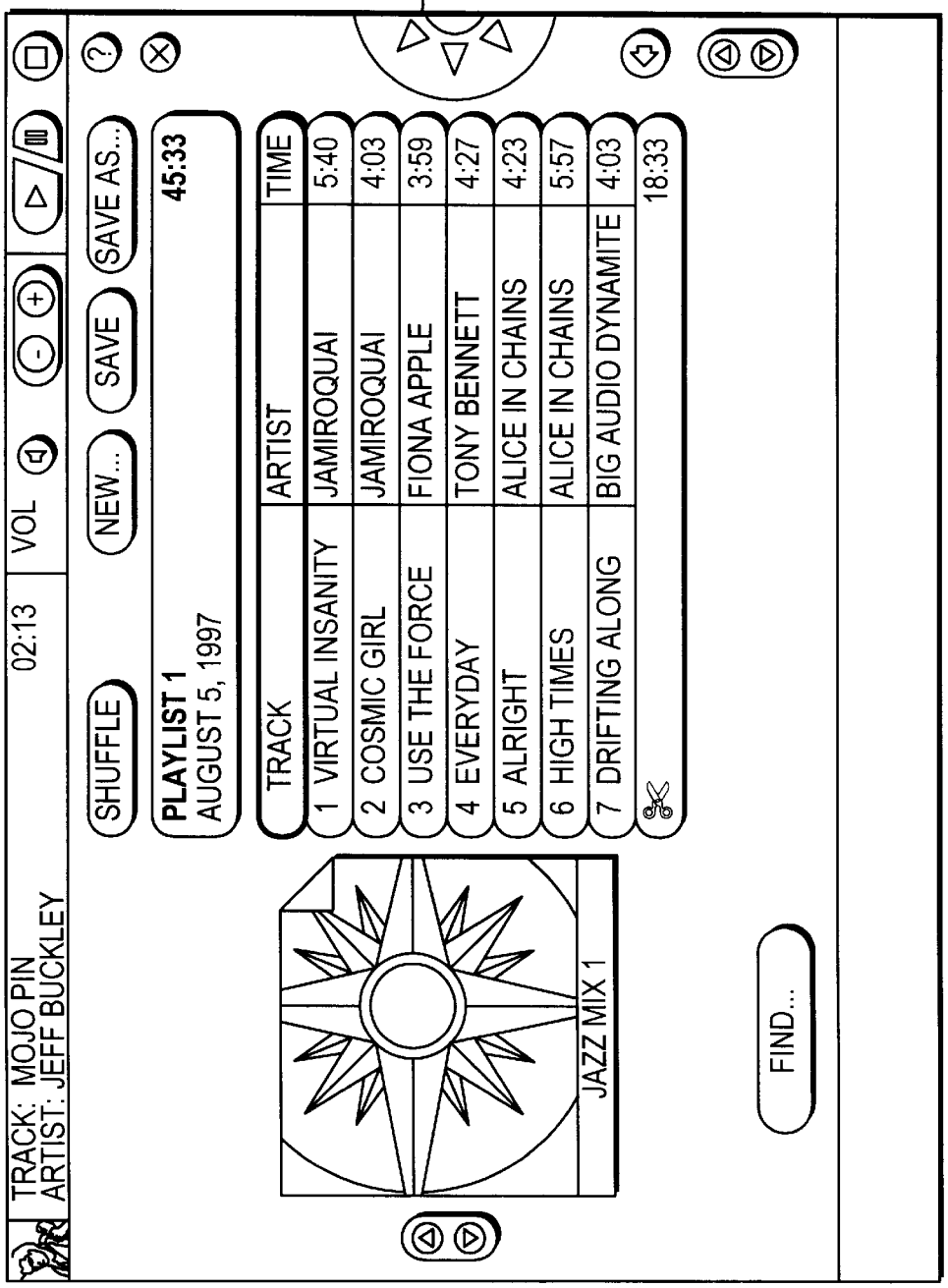
FIG. 9 is a representation of another playlist creation screen displayed by the enhanced graphic user interface of the invention.

As shown in FIG. 4, a playlist button 430 is provided. Actuation of the playlist button results in the display of playlist create screen 800, shown in FIG. 8. Screen 800 allows the user to define various parameters for a playlist, such as the genre of the list, if desired. Screen 800 also permits the user to search for all retained playlists meeting certain criteria, such as all playlists having a particular genre, by way of example. When a playlist is selected, as by actuating one of buttons 810, the graphic user interface displays the screen shown in FIG. 9, which is similar to the CD view screen of FIG. 6. Here, a user selects various songs to make up the user-defined playlist. Once defined, the playlist is saved and identified by a title created by the user. Rather than selecting entire CDs to be played back, the playlist function allows the user to select various songs from different CDs to be played back in the sequence established by the user. After selection of a plurality of songs to be played back from various CDs, this playlist and its name are stored, thereby generating a "virtual media" which may be manipulated as if it were an actual CD retained within the player. If a proper genre is selected by the user, an icon representing this "virtual" CD is displayed along with the cover art for the CDs of this genre when this genre is displayed, as shown in FIG. 4. It is appreciated that the user thus may design his or her own medium, without having to record the various songs from different CDs onto a further medium, thereby avoiding degradation in playback quality, and also reducing the overall amount of data required to be stored.

Figure 10:
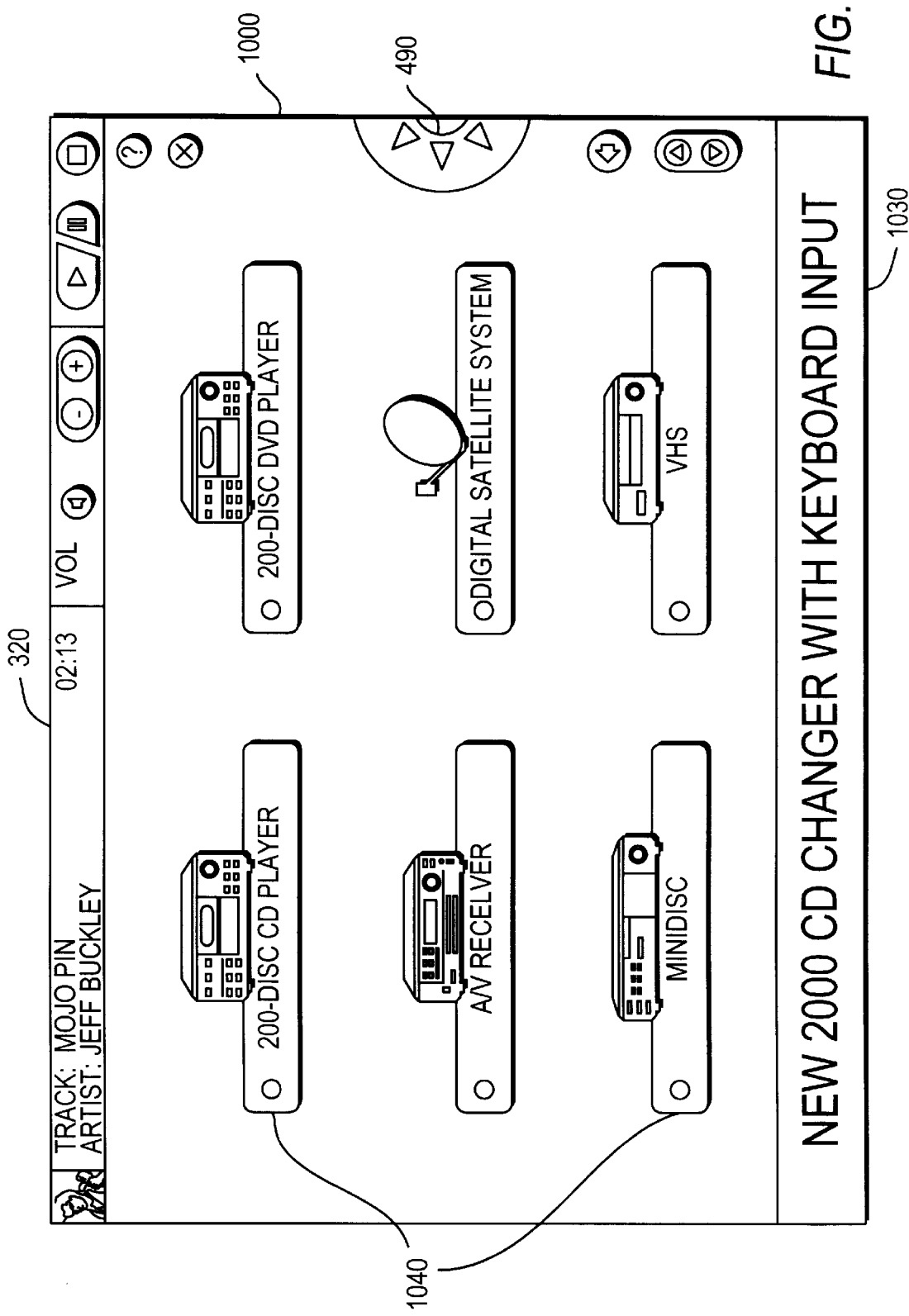
FIG. 10 is a representation of a system view screen displayed by the enhanced graphic user interface of the invention.

Let it now be assumed that the system view 350 shown in FIG. 3 is selected, resulting in display 1000 of FIG. 10. Display 1000 depicts a plurality of hardware components 1040 included in the user's home entertainment system and also includes status bar 320, jump menu 490 and a web ticker 1030. Web ticker 1030 is designed to display information regarding the hardware shown in system display 1000; and statistical information regarding the frequency of use of the individual hardware components is accumulated to retrieve additional information, from external sources, related to such hardware. For example, if the user is recording material onto a mini disc, information regarding mini disc producers may be provided, links to the websites of those procedures may be provided, and advertisements regarding sales of particular hardware components may also be provided.

Figure 11:
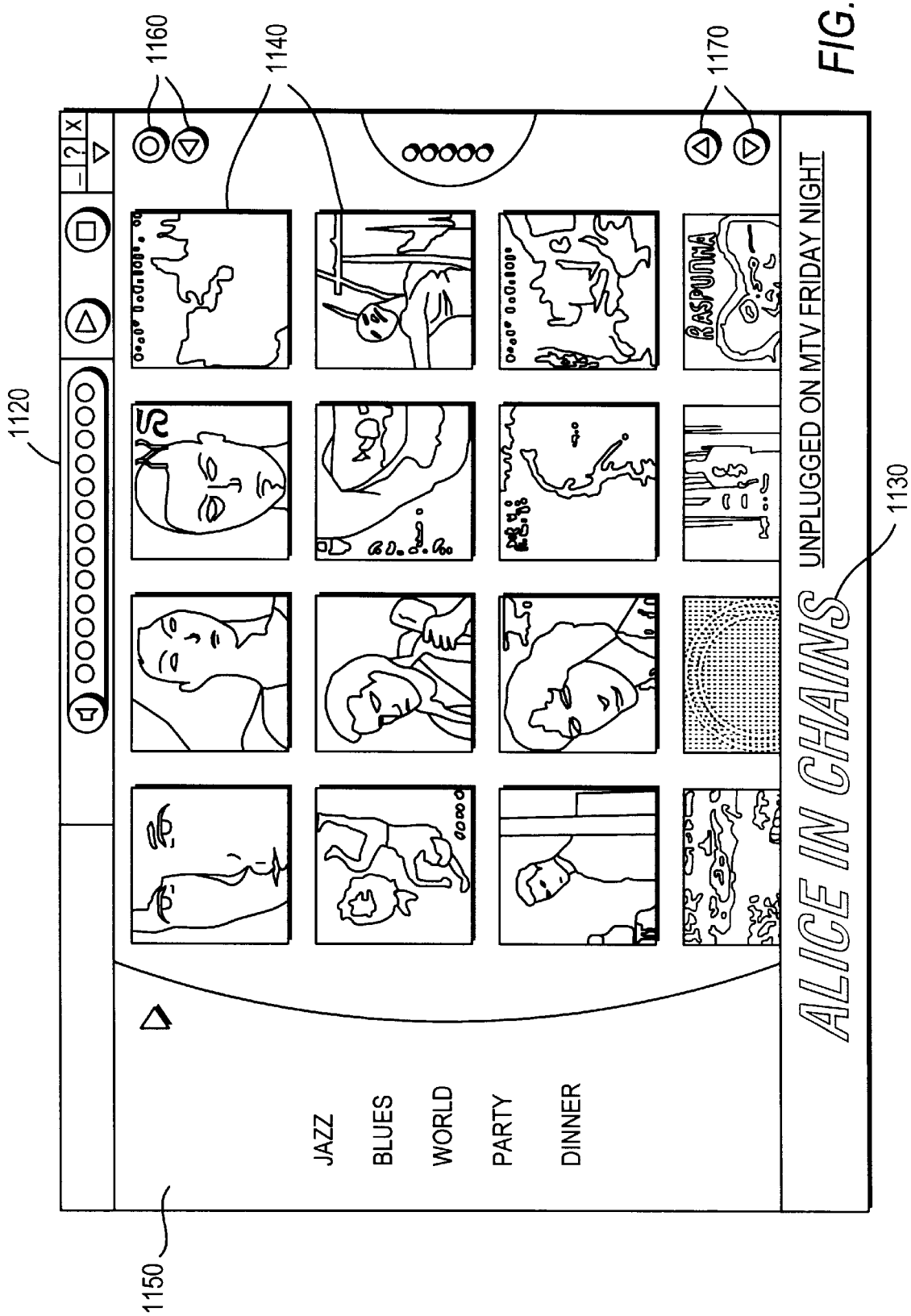
FIG. 11 is a representation of the display provided by the graphic user interface depicting cover art for the CDs in a user's CD player associated with a particular genre in accordance with an alternative embodiment of the invention.

Reference is next made to FIG. 11, which is similar to FIG. 4, but is employed with a remote commander as user input 180, rather than the mouse described above. In this alternative embodiment, enhanced graphic display 170 comprises a television screen. As is conventional, the remote commander has a four-way cursor with an enter button for navigating through and selection of the graphic depiction of the CD cover art. Alternatively, various other remote control devices, such as that provided with a web TV, a DSS system or the like, may be utilized. In the display of FIG. 11, a sort selection button 1150, a status bar 1120, stop and play buttons 1160, scroll buttons 1170 and web ticker 1130 are all provided with similar functionality as that shown in FIG. 4, but accessible through the use of the remote commander.

Figure 12:
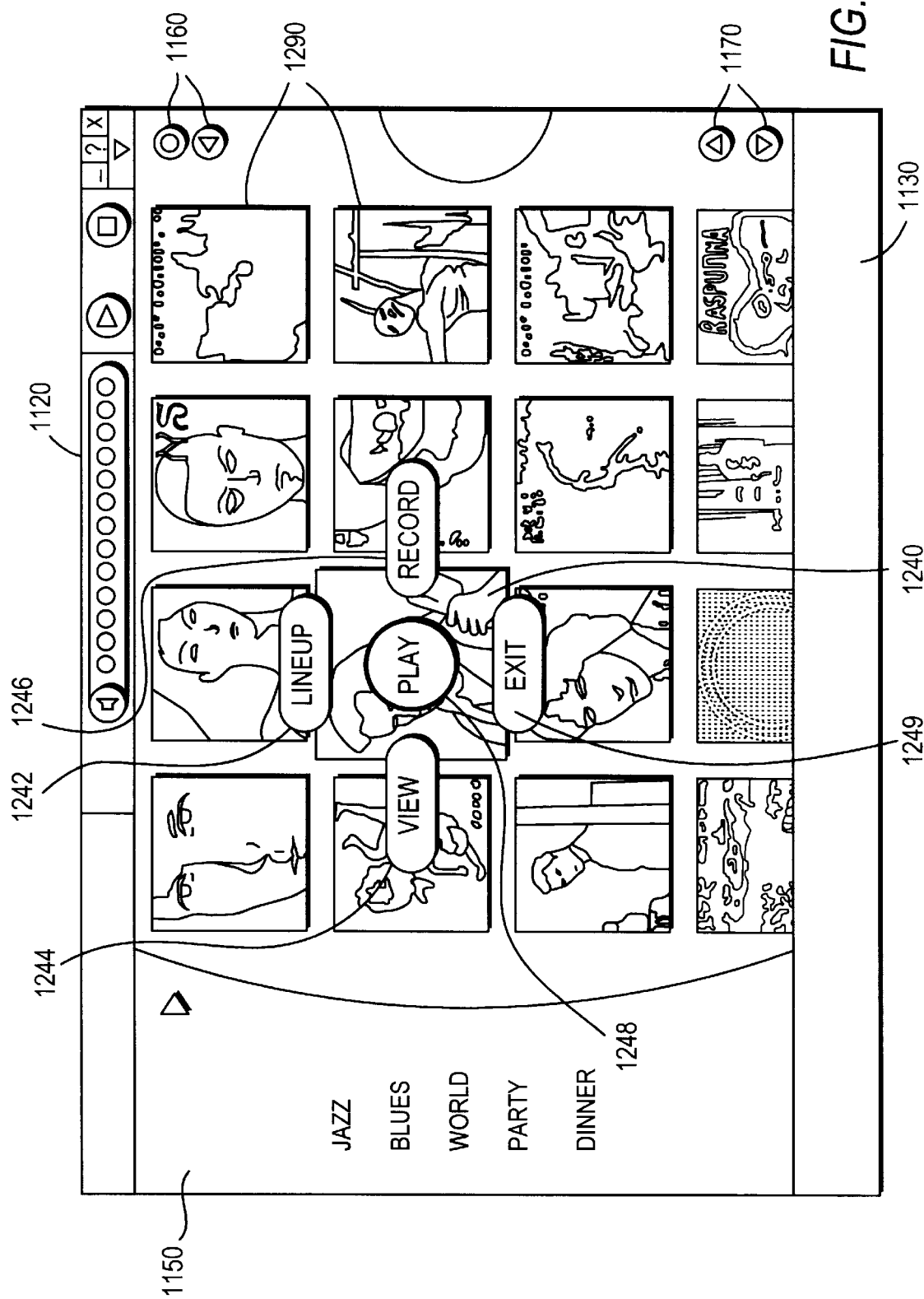
FIG. 12 is a representation of the display provided by the graphic user interface depicting the options available when a particular CD has been selected in accordance with an alternative embodiment of the invention.

If a particular CD is selected, as shown in FIG. 12, a plurality of additional user-selectable options are provided in an arrangement similar to the button arrangement of the remote controller. For example, a line up selection 1242, a view selection 1244, a record selection 1246, a play selection 1248 and an exit selection 1249 are provided. If the user simply wishes to play the selected CD, the cursor is directed to highlight play button 1248, and the enter button is depressed on the remote controller. By selecting lineup button 1242, the user can place the selected CD in a first-in, first-out queue, so that the CDs selected for lineup can be replayed in the order of their selection. This allows the user to perform a so-called jukebox function.

By selecting the view button 1244, various additional information regarding the CD may be displayed, such as that shown in FIG. 6. Selection of the record button 1246 allows for the recording of the CD onto a mini disc, or other writable, recordable medium which is included in the home entertainment system. Finally, exit button 1249 is depressed to exit the mode represented by the display screen of FIG. 12 and to return to the mode shown in FIG. 11, where one of the plurality of CDs may be selected. It should be noted that once a particular CD has been selected to be played, information relating to that CD is displayed within status bar 1120, such as shown in FIG. 4, while other CDs may be selected for line-up, and additional information relating to such other CDs may be displayed, such as shown in FIG. 6. Thus, a user can listen to one type of music, while selecting other music to be played thereafter.

It will thus be seen that the objects set forth above, among those made apparent from the preceding description, are efficiently attained, and, since certain changes may be made in carrying out the present invention without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention hereindescribed and all statements of the scope of the invention which, as a matter of language, might be said to fall therebetween.

What is claimed is:

1. A graphic user interface for use with a multi-recording media storage apparatus, comprising:

means for determining the identity of at least one of a plurality of recording media retained within said multi-recording medium storage apparatus;

means for accumulating statistical information regarding at least the identity and loading or playback frequency of said at least one of said plurality of recording media;

means for obtaining from an external database additional information regarding said at least one of said plurality of recording media based upon the identity thereof; and means for obtaining from an external information source further additional information in accordance with said accumulated statistical information, wherein said graphic user interface allows a user to view and manipulate said additional information and said further additional information.

2. The graphic user interface of claim 1, wherein said recording medium is a compact disc (CD).

3. The graphic user interface of claim 1, wherein said recording medium is a mini disc.

4. The graphic user interface of claim 1, wherein said recording medium is a digital audio tape.

5. The graphic user interface of claim 1, wherein said additional information includes textual information regarding said recording medium.

6. The graphic user interface of claim 5, wherein said textual information includes liner notes.

7. The graphic user interface of claim 5, wherein said additional textual information includes information regarding other recordings by an artist whose performance is recorded on said recording medium.

8. The graphic user interface of claim 7, wherein said additional textual information includes concert information regarding an artist whose performance is recorded on said recording medium.

9. The graphic user interface of claim 1, wherein said additional information includes at least compact disc (CD) cover art.

10. The graphic user interface of claim 9, further comprising selection means for selecting a compact disc to be played by selecting a desired cover art associated with a particular compact disc.

11. The graphic user interface of claim 10, wherein said user selection means is operable for a user to select a plurality of compact discs to be played in a user-defined sequence.

12. The graphic user interface of claim 10, wherein said user selection means is operable for a user to select a song to be played from said selected compact disk.

13. The graphic user interface of claim 12, wherein said user selection means is operable for a user to select a plurality of songs to be played from a plurality of compact discs in a user-defined sequence so as to generate a playlist.

14. The graphic user interface of claim 13, further comprising:
- means operable for a user to define a virtual media by assigning a permanent designation to said playlist; and
- means for storing said playlist and said permanent designation in internal memory;
- wherein said virtual media may be manipulated in accordance with said graphic user interface as if said virtual media were a compact disc so that the selection of the designation of the virtual media results in said playlist being played back one of said plurality of recording media retained within said multi-recording medium storage.

15. The graphic user interface of claim 14, further comprising means for a user to enter a plurality of textual information to be stored in said internal memory regarding said virtual media to be displayed when said virtual media is being played back.

16. The graphic user interface of claim 1, further comprising playlist means for recording on a rewritable medium a playlist of a plurality of user-selected songs from a plurality of recording media.

17. The graphic user interface of claim 16, wherein said rewritable medium is a mini disc.

18. The graphic user interface of claim 16, wherein said rewritable medium is a digital audio tape.

19. The graphic user interface of claim 16, wherein said additional information associated with each recording medium on which each song in said playlist is recorded is also recorded on said rewritable medium.

20. The graphic user interface of claim 1, wherein said graphic user interface includes means for displaying all of the retained recording media in a user-selected genre, said genre being included in said additional information.

21. The graphic user interface of claim 20, wherein said means for displaying is operable to display additional information including at least cover art for each recording medium in said user-selected genre.

22. A graphic user interface, comprising:
- means for determining the identity of at least one of a plurality of recording media retained within said multi-recording medium storage apparatus;
- means for accumulating statistical information regarding the identity of said at least one of said plurality of recording media;
- means for obtaining from an external database additional information regarding said at least one of said plurality of recording media based upon the identity thereof; and
- means for obtaining from an external information source further additional information in accordance with said statistical information;
- wherein said graphic user interface allows a user to view and manipulate said additional information and said further additional information; and
- means for accumulating statistical information representing the frequency with which at least one particular recording medium is played by a user.

23. The graphic user interface of claim 22, further comprising means for providing to a user, based upon the frequency of play of at least one retained recording medium, updated information relating to said at least one recording medium from an external information service in accordance with said further additional information.

24. The graphic user interface of claim 22, further comprising means for providing to a user, based upon the frequency of play of at least one retained recording medium, links to a particular website from an external web site listing data source in accordance with said further additional information.

25. A graphic user interface, comprising:
- means for determining the identity of at least one of a plurality of recording media retained within said multi-recording medium storage aparatus;
- means for accumulating statistical information regarding the identity of said at least one of said plurality of recording media;
- means for obtaining from an external database additional information regarding said at least one of said plurality of recording media based upon the identity thereof; and
- means for obtaining from an external information source further additional information in accordance with said statistical information;
- wherein said graphic user interface allows a user to view and manipulate said additional information and said further additional information; and
- wherein said statistical information includes information representing the frequency of play of retained recording media of at least one particular artist.

26. The graphic user interface of claim 25, further comprising means for providing to a user, based upon the frequency of play of at least one retained recording medium of at least one particular artist, updated information relating to said at least one retained recording medium from an external information source in accordance with said further additional information.

27. The graphic user interface of claim 25, further comprising means for providing to a user, based upon the frequency of play of at least one retained recording medium of at least one particular artist, links to a particular website from an external web site listing data source in accordance with said further additional information.

28. A graphic user interface for use with a multi-disc CD player, comprising:
- means for determining the identity of at least one of a plurality of CDs retained within said multi-disc CD player; and
- means for accumulating information regarding playback frequency for said at least one CD;
- means for obtaining from an external database additional information regarding said at least one of said CDs based upon the identity and accumulated information thereof;
- wherein said graphic user interface displays said additional information.

29. The graphic user interface of claim 28, wherein said additional information includes at least CD cover art.

30. The graphic user interface of claim 29, further comprising user selection means for selecting a CD to be played by said CD player by selecting a desired cover art associated with a particular CD.

31. The graphic user interface of claim 29, wherein said additional information further includes at least a list of songs associated with said one of said plurality of CDs.

32. The graphic user interface of claim 31, further comprising:
- means operable for a user to define a user-defined playlist; and
- means operable for a user to select songs to be included on said playlist from said list of songs of said additional information.

33. The graphic user interface of claim 32, further comprising:

means operable for a user to establish a designation of said user-defined playlist; and memory means for storing said user-defined playlist and said designation.

34. The graphic user interface of claim 28, wherein said additional information includes at least liner notes associated with said at least one of said plurality of CDs.

35. A graphic user interface for use with a multi-recording media storage apparatus, said multi-recording media storage apparatus having at least one hardware apparatus coupled thereto, said multi-recording media storage apparatus, said graphic user interface and said at least one coupled hardware apparatus being located at a first, local location, comprising:

means for accumulating statistical information regarding the use of said hardware apparatus; and means for obtaining additional information from an external database located at a second, remote location in accordance with said statistical information.

36. The graphic user interface of claim 35, wherein said additional information includes at least product information updates related to said at least one associated hardware apparatus.

37. The graphic user interface of claim 35, wherein said additional information includes links to web sites associated with said at least one hardware apparatus.

38. A method for controlling a multi-recording media storage apparatus by a graphic user interface, comprising the steps of:

determining the identity of at least one of a plurality of recording media retained within a multi-recording medium storage apparatus;

accumulating statistical information regarding at least the identity and loading or playback frequency of said at least one of said plurality of recording media;

obtaining from an external database additional information regarding said at least one of said plurality of recording media based upon the identity thereof;

obtaining from an external information source further additional information in accordance with said accumulated statistical information; and manipulating said additional information and said further additional information by using said graphic user interface.

39. The method of claim 38, wherein said recording medium is a compact disc (CD).

40. The method of claim 38, wherein said recording medium is a mini disc.

41. The method of claim 38, wherein said recording medium is a digital audio tape.

42. The method of claim 38, wherein said additional information includes textual information regarding said recording medium.

43. The method of claim 42, wherein said textual information includes liner notes.

44. The method of claim 42, wherein said additional textual information includes information regarding other recordings by an artist whose performance is recorded on said recording medium.

45. The method of claim 42, wherein said additional textual information includes concert information regarding an artist whose performance is recorded on said recording medium.

46. The method of claim 38, wherein said additional information includes at least compact disc (CD) cover art.

47. The method of claim 46, further comprising the step of selecting a compact disc to be played by selecting a desired cover art associated with one particular compact disc.

48. The method of claim 38, further comprising the step of selecting a plurality of compact discs to be played in a user-defined sequence.

49. The method of claim 38, further comprising the step of selecting a song to be played from said selected compact disc.

50. The method of claim 49, further comprising the step of generating a playlist by selecting a plurality of songs to be played from a plurality of compact discs in a user-defined sequence.

51. The method of claim 50, further comprising the steps of:

defining a virtual media by assigning a permanent designation to a playlist;

storing said playlist and permanent designation in internal memory;

manipulating said virtual media as if said virtual media were a compact disc; and selecting the designation of the virtual media in order to play back said playlist.

52. The method of claim 51, further comprising the step of storing a plurality of textual information regarding said virtual media to be displayed when said virtual media is being played back.

53. The method of claim 38, further comprising the step of defining a playlist to be recorded on a rewritable medium by selecting a plurality of user-selected songs from a plurality of retained compact discs.

54. The method of claim 53, further comprising the step of recording said playlist on a mini disc.

55. The method of claim 53, further comprising the step of recording said playlist on a digital audio tape.

56. The method of claim 53, further comprising the step of also recording on said rewritable medium said additional information associated with each recording medium on which each song in said playlist is recorded.

57. The method of claim 38, further comprising the steps of:

selecting a genre to be included in said additional information; and displaying all of the recording media of a user-selected genre on said graphic user interface.

58. The method of claim 57, further comprising the step of displaying additional information on said graphic user interface including at least cover art for each recording media in said user-selected genre.

59. A method for controlling a multi-recording media storage apparatus by a graphic user interface, comprising the steps of:

determining the identity of at least one of a plurality of recording media retained within a multi-recording medium storage apparatus;

accumulating statistical information regarding the identity of said at least one of said plurality of recording media;

obtaining from an external database additional information regarding said at least one of said plurality of recording media based upon the identity thereof;

obtaining from an external information source further additional information in accordance with said statistical information;

manipulating said additional information and said further additional information by using said graphic user interface; and obtaining statistical information representing the frequency with which at least one particular recording medium is played by a user.

60. The method of claim 59, further comprising the step of, based upon the frequency of play of at least one particular recording medium, providing updated information to a user related to said at least one particular recording medium from an external information service in accordance with said further additional information.

61. The method of claim 59, further comprising the step of, based upon the frequency of play of at least one particular recording medium, providing links to a particular website to a user related to said at least one particular recording medium from an external web site listing data source in accordance with said further additional information.

62. A method for controlling a multi-recording media storage apparatus by a graphic user interface, comprising the steps of:

determining the identity of at least one of a plurality of recording media retained within a multi-recording medium storage apparatus;

accumulating statistical information representing the identity of said at least one of said plurality of recording media and the frequency of play of retained recording media of at least one particular artist;

obtaining from an external database additional information regarding said at least one of said plurality of recording media based upon the identity thereof;

obtaining from an external information source further additional information in accordance with said statistical information; and manipulating said additional information and said further additional information by using said graphic user interface.

63. The method of claim 62, further comprising the step of, based upon the frequency of play of retained recording media of at least one particular artist, providing updated information to a user related to said at least one particular recording medium from an external information service in accordance with said further additional information.

64. The method of claim 62, further comprising the step of, based upon the frequency of play of retained recording media of at least one particular artist, providing links to a particular website to a user related to said at least one particular recording medium from an external web site listing data source in accordance with said further additional information.

65. A method for controlling a multi-disc CD player by a graphic user interface, comprising the steps of:

determining the identity of at least one of a plurality of CDs retained within said multi-disc CD player;

accumulating information regarding loading or playback frequency for said at least one CD;

obtaining from an external database additional information regarding said at least one of said CDs based upon the identity and accumulated information thereof; and displaying said additional information on a graphic user interface.

66. The method of claim 65, wherein said additional information includes at least CD cover art.

67. The method of claim 66, further comprising the step of selecting a CD to be played by said CD player by selecting a desired cover art associated with one particular CD.

68. The method of claim 66, wherein said additional information includes at least a list of songs associated with said one of said plurality of CDs.

69. The method of claim 68, further comprising the step of defining a user-defined playlist by selecting songs to be included on said playlist from said list of songs of said additional information.

70. The method of claim 69, further comprising the steps of:

establishing a designation of said user-defined playlist; and storing said user-defined playlist and said designation in a local memory.

71. The method of claim 65, wherein said additional information includes at least liner notes associated with said at least one of said plurality of CDs.

72. A method for controlling a multi-recording media storage apparatus and at least one associated hardware apparatus coupled thereto, by a graphic user interface, said multi-recording media storage apparatus, said graphic user interface, and said at least one associated hardware apparatus being located at a first, local location, comprising the steps of:

accumulating statistical information regarding the use of said hardware apparatus; and obtaining additional information from an external database located at a second, remote location in accordance with said statistical information.

73. The method of claim 72, wherein said additional information includes at least product information updates related to said at least one associated hardware apparatus.

74. The graphic user interface of claim 72, further comprising the step of obtaining, from an external web site listing data source, links to web sites associated with said at least one hardware apparatus in accordance with said additional information.

* * * * *